(12) United States Patent
Negahdar

(10) Patent No.: US 9,118,664 B1
(45) Date of Patent: Aug. 25, 2015

(54) PASSWORD SCHEME THAT CAN BE USED FOR SECURITY OF MODEMS IN AN INDEPENDENTLY OPERATED CABLE SYSTEM THAT IS SCALABLE WITH DYNAMICALLY CHANGEABLE PASSWORDS

(71) Applicant: ARRIS Enterprises, Inc., Suwanee, GA (US)

(72) Inventor: Ali Negahdar, Duluth, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 3 days.

(21) Appl. No.: 14/187,657

(22) Filed: Feb. 24, 2014

(51) Int. Cl.
*H04L 29/06* (2006.01)
*H04L 9/32* (2006.01)
*H04L 9/30* (2006.01)

(52) U.S. Cl.
CPC .............. *H04L 63/0846* (2013.01); *H04L 9/30* (2013.01); *H04L 9/3226* (2013.01); *H04L 63/0442* (2013.01)

(58) Field of Classification Search
CPC .................................................. H04L 63/0442
USPC .......................................................... 713/168
See application file for complete search history.

(56) References Cited

U.S. PATENT DOCUMENTS 6,510,162 B1 * 1/2003 Fijolek et al. ................. 370/432
8,266,449 B2 * 9/2012 Challener et al. ............. 713/189

* cited by examiner

*Primary Examiner* — Longbit Chai
(74) *Attorney, Agent, or Firm* — Thomas A. Ward

(57) ABSTRACT

A password scheme is provided that can be used for security of cable modems in a cable network. In the system, the password is unique to each modem, the password is not fixed for the life of the device, is not shared across cable systems, is easily recoverable after a compromise, and is changed periodically based on some type of configuration. In the system each modem creates its own random password. Then the modem encrypts the password using a public key provided by the cable system and stores the encrypted password in a Management Information Base (MIB) operated by the cable system. The MIB operator decrypts the encrypted password corresponding to the public key and recovers the password. The cable operator uses the password to log in remotely to the modem. If a compromise or change of the public key or password occurs, the password is regenerated using the same procedure.

15 Claims, 2 Drawing Sheets

PASSWORD SCHEME THAT CAN BE USED FOR SECURITY OF MODEMS IN AN INDEPENDENTLY OPERATED CABLE SYSTEM THAT IS SCALABLE WITH DYNAMICALLY CHANGEABLE PASSWORDS

BACKGROUND

1. Technical Field

The present invention relates to a system for password access to consumer premises equipment (CPE), such as a cable modem with Wi-Fi transmission capability, in a network, such as a cable system which can be scalable between a network with only a few connected cable modems to a much larger system with many cable modems connected.

2. Related Art

CPE system devices typically require passwords to enable developers to access a cable system. Passwords enable access to each cable modem (CM) in the system. It is desirable to have system configurations available that provide a cable system operator strong unique passwords that are dynamic and can be distributed in a CPE environment on a large scale depending on the cable system configuration and needs.

SUMMARY

Embodiments of the present invention provide a password system that uses strong unique passwords that are dynamic and scalable, can be distributed in a CPE environment to devices such as cable modems, and can be easily recovered in case of compromise. In the system, the password is unique to each device, it is not fixed for the life of the device, and is changed periodically based on some type of configuration.

The system is defined in some embodiments by the following requirements:

1. A unique password is provided to each unit, or modem.
2. The password must be random and be changed periodically.
3. The system should not be centralized over a group of cable systems, or in other words the system is operated by a single cable system provider and none of the public keys, private keys or passwords for the system devices are shared with other cable systems.
4. The system must be recoverable quickly after compromise.
5. The system must not rely on symmetric key distribution that will require software modification upon key compromise.
6. The solution must be scalable to handle many cable modems.

In one embodiment of a cable network system according to the present invention, the system operates first with each modem creating its own random password. Then the modem encrypts the password using a public key provided by the cable system and stores the encrypted password in a Management Information Base (MIB) operated by the cable system, the MIB being physically located in an individual cable modem. Once the modem in the system creates an encrypted password and stores it in the MIB, a user or operator of the cable system retrieves the MIB data and runs the encrypted password through a network management utility provided uniquely in the cable system that uses a private key corresponding to the public key and recovers the password. The CM obtains the public key from its config file with a (type/length/value) TLV file extension. If the public key in the config file is changed on the next reboot, the password must be regenerated and encrypted using the new public key and the password replaced in the MIB using the procedure described above. The new public key and encrypted password will replace the old ones in the NVRAM.

If the cable system private key gets compromised, the network management utility for the single cable system can generate a new key pair, and the new public key will be provided to replace the old public key in the config file in each modem. This solution limits the security exposure due to key compromise since only to the cable system that owns the compromised key pair will be affected and any other cable systems that might otherwise be interconnected to a central security service system are not affected. To recover, the single cable system simply replaces the key pair. Recovery does not involve any changes to the software, firmware or hardware of the cable system.

The system can be implemented in a way that an individual modem password gets renewed periodically if the user wishes based on a validity period. With a validity time period implemented, the modem tags the password with the validity period. Once the password gets to its end of validity period, it gets renewed, encrypted and stored in the MIB.

The network management utility of each individual cable system can generate its own public and private keys. A "single" "static" key system to secure multiple cable systems is not required, allowing a single cable system to be more distributed and scalable to add more modems when needed based on the individual cable system requirements.

BRIEF DESCRIPTION OF THE DRAWINGS

Further details of the present invention are explained with the help of the attached drawings in which.

DETAILED DESCRIPTION

Figure 1:
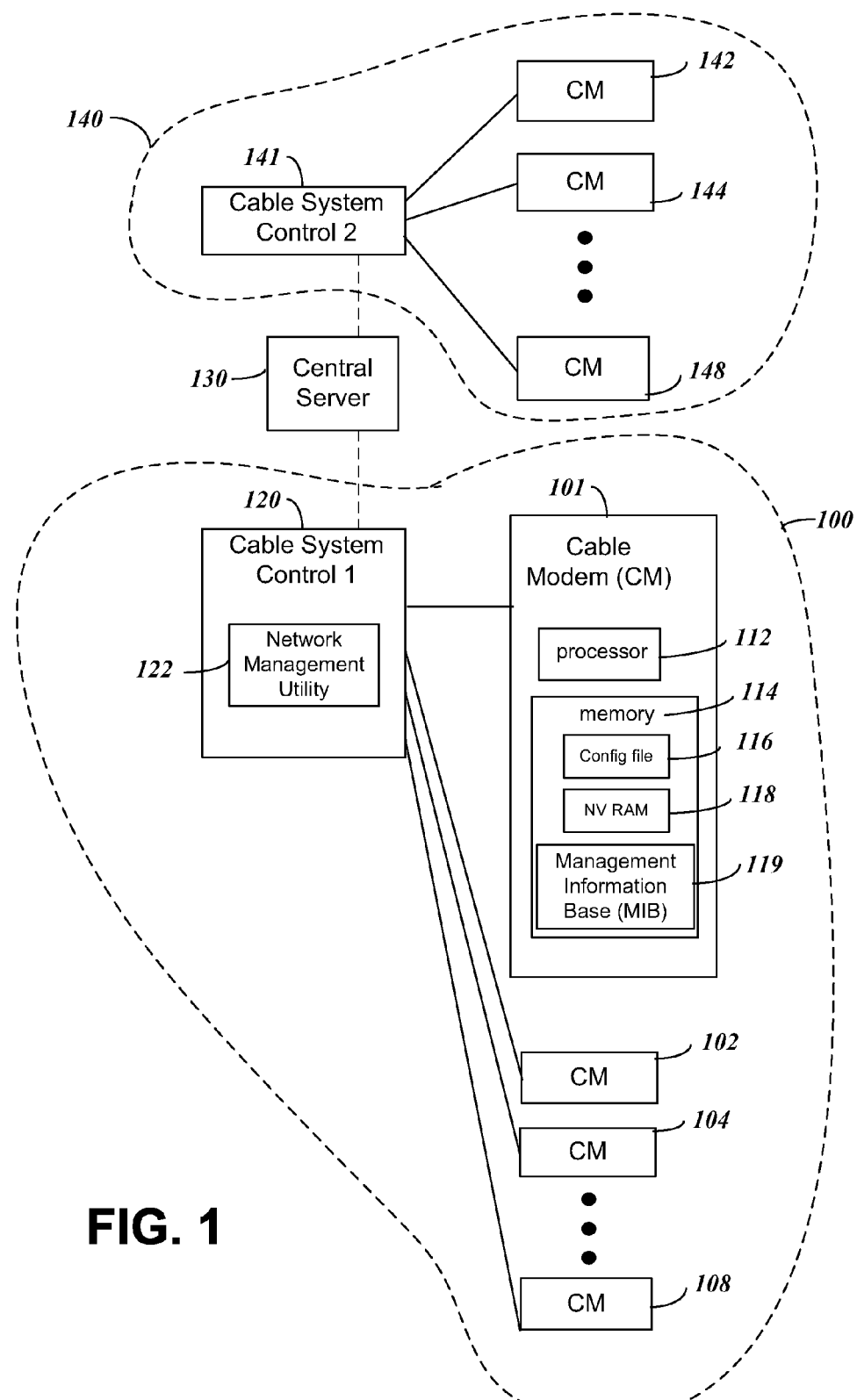
FIG. 1 shows a cable network system that can be used to implement embodiments of the present invention.

FIG. 1 shows a cable network system that can be used to implement embodiments of the present invention. FIG. 1 includes a first cable system network 100 that includes a cable network control 120 and connected cable modems 101, 102, 104 and 108. As illustrated, between cable modems 104 and 108 additional modems can be included to scale the network to a much larger system. The cable modem 101 shows internal components that can be used in accordance with embodiments of the present invention. The cable modem includes a processor 112 and memory 114. The memory 114 stores code that enables the processor to perform steps described for the present invention. Although not specifically shown, the cable network control 120 likewise includes one or more processors with memory to enable functions to be performed. The memory 114 further includes a non-volatile RAM 118 portion for storing passwords, security keys and other data as described subsequently. The memory 114 also includes a configuration memory 116 to store data, as described subsequently. The memory also includes a Management Information Base (MIB) 119 that provides for storage of passwords. The MIB data is retrievable by a cable system operator using a MIB browser utility. The cable network control 120 includes a network management utility 122 that stores public and private keys and performs the function of encrypting and decrypting data and passwords as described subsequently.

Although embodiments of the present invention enable the first cable system network 100 to operate independently of other cable system networks, FIG. 1 shows how other cable system could be interconnected. The first cable system network 100 is connected to a central server 130. Additional cable system networks, like second cable system network 140, can be included in an interconnected network system as controlled by a central server 130. The second cable system network 140 includes a cable system control 141 and cable modems 142, 144 and 148, similar to the cable system 100. The password scheme of the present invention prevents contamination of passwords by not having the passwords controlled by the central server 130, and by having the passwords confined within a single cable system network, such as network 100.

In the system of the embodiments of the present invention, a password scheme is provided that can be used for security of cable modems in a cable network. In the system, the password is unique to each modem, the password is not fixed for the life of the device, the password is not shared across cable systems, the password is easily recoverable after a compromise, and the password is changed periodically based on some type of configuration. In the case of CM, the validity period will be added to the CM config file in the form of a TLV.

The system of embodiments of the present invention can be defined by the following requirements:

1. A unique password is provided to each unit, or modem.
2. The password must be random and be changed periodically.
3. The system should not be centralized over a group of cable systems. In other words, the system is operated by a single cable system provider and none of the public keys, private keys or passwords for the system devices are shared with other cable systems. A centralized secure server used to distribute and share keys or passwords between different cable system operations is not utilized. Thus, a single cable system operator can support security of the entire system without requiring an outside service that supports other cable systems to provide password security. The cable system operator, or each individual system user, can set up and configure its own security system.
4. The system must be recoverable quickly and easily if it gets compromised.
5. The system must not rely on any symmetric key in the software that will require software modification upon key compromise.
6. The solution must be scalable by enabling addition of devices, such as modems, to the system.

The system operation is described in the following paragraphs.

First, the operator of the cable system inserts its public key and optional password validity period in the CM config file. An alternative is to insert a certificate (e.g. X509 certificate) in the config file instead of the public key. The CM downloads the config file securely at boot up from the cable operator's provisioning server. The config file authentication is not described here since different methods can be used to deliver the config file securely. In the case of CM, standard DOCSIS config file authentication is implemented. The cable modem saves the public key in the NVRAM. If the public key in the config file is changed on the next reboot, the password must be regenerated and encrypted using the new public key and the password replaced in the MIB using the procedure described below. The new public key and encrypted password will replace the old ones in the NVRAM. In one alternative to avoid storing the public key in NVRAM in case of memory limitation, the public key can be in the config file all the time to insure the CM receives the public key after each reboot.

Next, in the cable network system each modem creates its own random password. Then the modem encrypts the password using the public key provided by the cable system and stores the encrypted password in a Management Information Base (MIB) and in NVRAM. In one alternative instead of storing the password in a MIB, the password storage can be more generic to cover other protocols such as the TR-069. Each modem further stores the encrypted password in its own Non-Volatile Ram (NVRAM) accessible by TR-069 protocol.

Once a modem in the system creates an encrypted password and stores it in the MIB, a user or operator of the cable system retrieves the MIB data and runs the encrypted password through a network management utility provided uniquely in the cable system that uses a private key corresponding to the public key and recovers the password.

Figure 2:
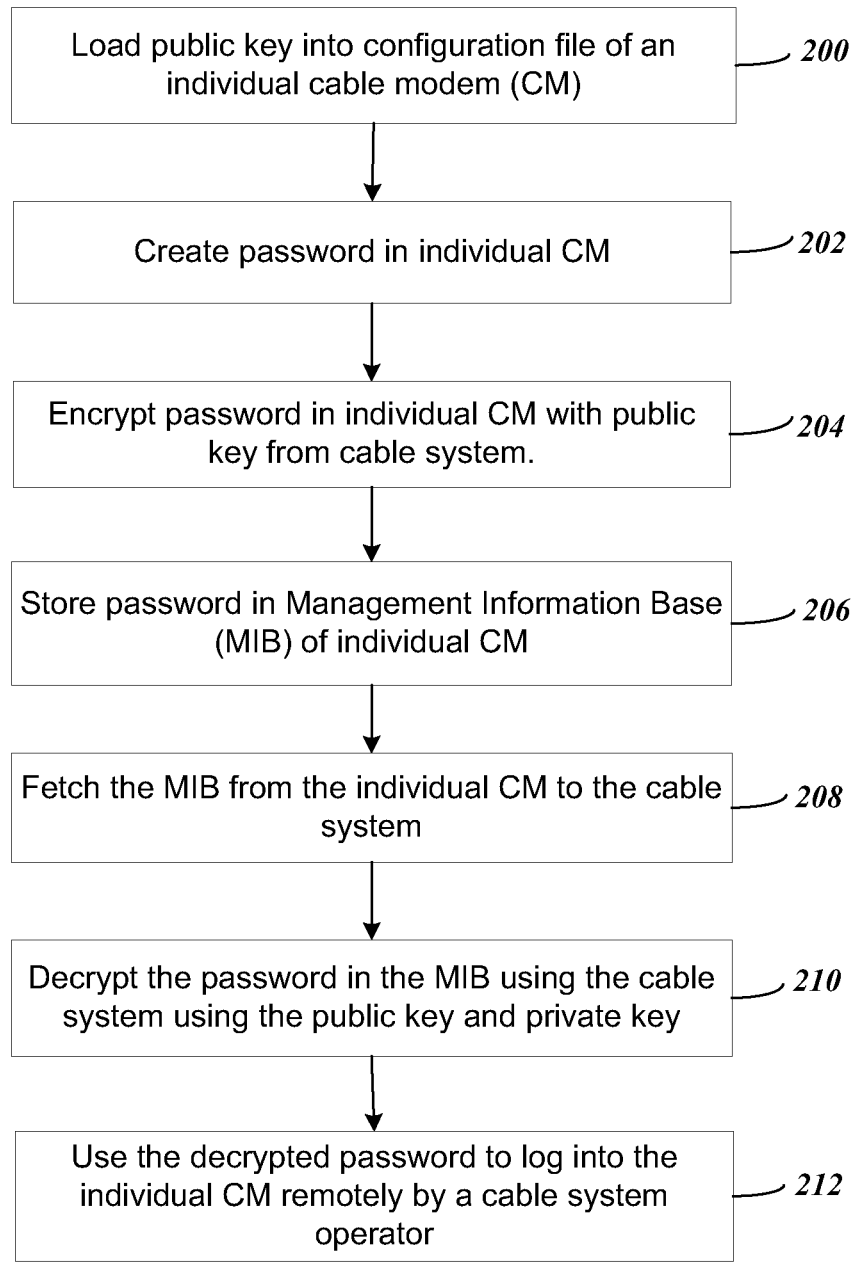
FIG. 2 shows a flowchart illustrating operation of a modem in a network with password generation according to the present invention.

FIG. 2 shows a flowchart illustrating operation of a modem in a network with password generation according to the present invention. In a first step 200, the public key provided by the cable system network is loaded into the config file of an individual cable modem (CM). In a next step 202, the individual CM in the network creates its own unique password. In step 204 the individual modem encrypts the password using a public key provided by the cable system network. In step 206 the modem stores the encrypted password in the MIB of the individual modem. In a further step 208, the cable system operator fetches the MIB from the individual CM. Next in step 210 the cable system uses a public key and private key pair to decrypt the password in the MIB. Finally, in a step 212 the cable system operator or user can now use the password to remotely log in to the individual CM.

If the cable system private key gets compromised, the network management utility for the single cable system can generate a new key pair, and the new public key will be provided to replace the old public key in the config file in each modem. This solution limits the security exposure due to key compromise since only to the cable system that owns the compromised key pair will be affected and any other cable systems that might otherwise be interconnected to a central security service system are not affected. To recover, the single cable system simply replaces the key pair. Recovery does not involve any changes to the software, firmware or hardware (SW/FW/HW) of the cable system.

The system can be implemented in a way that an individual modem password gets renewed periodically if the user wishes based on a validity period. With a validity time period implemented, the modem tags the password with the validity period. Once the password gets to its end of validity period, it gets renewed, encrypted and stored in the MIB. If the CM does not get Time of Day to set its clock, the modem will continue using the current password. If a certificate is used in the config file, the certificate can have a short validity period to minimize its exposure to compromise.

The network management utility can be developed using a generally available platform such as Windows or Linux which can take the private key and the encrypted password and returns the decrypted password. As an alternative to a generally available platform for key storage, the user may want to use a Hardware Security Module to store the utility private key in the back office as part of their security solution. The network management utility software can be distributed by a system supplier to individual cable companies, even though the network management utilities when functioning do not interconnect between cable companies. The network management utility of each cable system will generates its own public/private key (or multiple key pairs if they break down their network). A "single" "static" key to secure multiple cable systems is not required, allowing a single cable system to be more distributed and scalable to add more modems when needed based on the individual cable system requirements. The system can be extended to have multiple access levels by generating multiple passwords. Each password is assigned different access level to the device command line.

Although the present system, method and apparatus has been described above with particularity, this was merely to teach one of ordinary skill in the art how to make and use the in system, method and/or apparatus. Many additional modifications will fall within the scope of the system, method and/or apparatus, as that scope is defined by the following claims.

What is claimed:

1. A method for providing password protection for a modem in a cable system network comprising:
   selecting a random password using the modem connected in the cable system network to a cable system independent of a centralized secure server that interconnects the cable system and other cable systems, wherein a plurality of cable systems networks are interconnected through the centralized secure server while the password is confined within a single cable system network and is not controlled by the centralized secure server;
   changing the password periodically; and
   receiving a public key that has a corresponding private key which is created and maintained by a network management utility of the confined cable system network that are independent of the centralized secure server, the public key and private key being used to encrypt and decrypt the password to access each individual modem of the cable system network.

2. The method of claim 1, further comprising:
   encrypting the password in the modem using the public key;
   storing the encrypted password in a Management Information Base (MIB) of the modem and storing the encrypted password in the non-volatile random-access memory (NVRAM) of the modem; and
   receiving at the modem a MIB get request from a network management utility that uses the private key corresponding to the public key for decryption of the password from the MIB to enable logon to the modem.

3. The method of claim 1, further comprising:
   storing the pubic key as a first public key in the modem config file,
   wherein if the first public key in the config file is changed on a reboot to a new public key, the method further comprises:
      regenerating a new password in the modem;
      encrypting the new password using the new public key; and
      storing the encrypted password in the NVRAM to replace the first public key in the NVRAM.

4. The method of claim 3, wherein the network management utility is operated by the cable system.

5. The method of claim 4, wherein the network management utility device manages the private key as a single key to secure the modem and other modems in the network.

6. The method of claim 5, wherein the network is scalable to enable introduction of additional modems to the system while maintaining the single static key, wherein the additional modems each have a unique password.

7. The method of claim 6 further comprising:
   determining with the network management utility device when the private key is compromised; and
   generating a new private key using the network management utility device when the compromise is determined; and
   generating a new public key using the network management utility device when the compromise is determined and storing the new public key in the CM config file.

8. The method of claim 7, wherein the cable system does not communicate the private key to the other cable systems.

9. The method of claim 7, wherein recovery by generating the new private key and the new public key are done without changes to software, firmware or hardware of the modem or the network management utility device in the network.

10. The method of claim 1, wherein the password has a timed validity time period, and the step of changing the password periodically comprises changing the password when the validity time period expires, wherein changing the password comprises:
    regenerating a new password in the modem;
    encrypting the new password using the public key; and
    storing the encrypted password in the NVRAM to replace the first public key in the NVRAM.

11. A method for providing password protection for a modem in a cable system network comprising:
    selecting a random password using the modem connected in the cable system network to a cable system of a centralized secure server, wherein a plurality of cable system networks are interconnected through the centralized secure server while the password is confined within a single cable system network and is not controlled by the centralized secure server, and wherein a public key and private key, provided by a network management utility of the confined cable system network, are used to encrypt and decrypt the password;
    storing the encrypted password in a Management Information Base (MIB) of the modem;
    receiving at the modem a MIB get request as provided by the network management utility that uses the private key corresponding to the public key for decryption of the password from the MIB to enable recovery and return of the password and logon to the modem to access each individual modem of the cable system network; and
    storing the pubic key as a first public key in the modem configuration file.

12. The method of claim 11, wherein if the first public key in the config file is changed to a new public key, the method further comprises:
    regenerating a new password in the modem;
    encrypting the new password using the new public key
    storing the encrypted new password in the MIB;
    storing the new public key in the modem config file.

13. A password protection system in a cable system network comprising:
    a central cable control system;
    a centralized secure server;
    a plurality of modems connected to the central cable control system, the plurality of modems including a first modem having a hardware processor and memory, the memory storing code for controlling the processor to perform the following steps:
    selecting a random password using the first modem, wherein a plurality of cable system networks are interconnected through the centralized secure server while the password is confined within a single cable system network and is not controlled by the centralized secure server, and wherein a public key and private key, provided by a network management utility of the confined cable system network, are used to encrypt and decrypt the password;

changing the password periodically; and receiving a public key that has a corresponding private key which is created and maintained by the network management utility of the confined cable system network that are independent of the centralized secure server, the public key and private key being used to encrypt and decrypt the password to access each individual modem of the cable system network.

14. The system of claim 13,
wherein the first modem further comprises a Management Information Base (MIB) memory and a non-volatile random-access memory (NVRAM), and
wherein the processor of the first modem is further controlled to perform the following steps:
encrypting the password;
storing the encrypted password in a MIB and storing the encrypted password in the NVRAM.

15. The system of claim 14, wherein the central system control uses the private key corresponding to the public key for decryption of the password from the MIB to enable logon to the first modem.

\* \* \* \* \*